US 6,659,877 B2

(12) United States Patent
Wiesneth et al.

(10) Patent No.: US 6,659,877 B2
(45) Date of Patent: Dec. 9, 2003

(54) ADJUSTABLE-LENGTH SHAFT

(75) Inventors: Thomas Wiesneth, Herzogenaurach (DE); Rudolf Folk, Burghaslach (DE)

(73) Assignee: Ina Walzlager Schaeffler OHG, Herzogenaurach (DE)

(*) Notice: Subject to any disclaimer, the term of this patent is extended or adjusted under 35 U.S.C. 154(b) by 0 days.

(21) Appl. No.: 10/021,222

(22) Filed: Oct. 30, 2001

(65) Prior Publication Data

US 2002/0064418 A1 May 30, 2002

(30) Foreign Application Priority Data

Oct. 31, 2000 (DE) .......................... 100 53 987

(51) Int. Cl.⁷ ................................. F16D 3/06
(52) U.S. Cl. ......................... 464/167; 384/49
(58) Field of Search ................ 464/167, 168; 384/46, 49, 53; 180/384; 74/492

(56) References Cited

U.S. PATENT DOCUMENTS

| | | | | |
|---|---|---|---|---|
| 3,665,777 A | * | 5/1972 | Jensen ........................ | 74/492 |
| 4,269,043 A | * | 5/1981 | Kizu et al. ................. | 74/492 X |
| 4,572,022 A | * | 2/1986 | Mettler ....................... | 74/492 |
| 4,620,351 A | * | 11/1986 | Teramachi ................. | 464/168 X |
| 5,020,925 A | * | 6/1991 | Stephan et al. | |
| 5,236,264 A | * | 8/1993 | Matsubara et al. ........ | 384/49 |
| 6,339,970 B1 | * | 1/2002 | Blex .......................... | 74/492 |
| 6,478,466 B1 | * | 11/2002 | Chang et al. ............... | 384/49 |

FOREIGN PATENT DOCUMENTS

| | | | | |
|---|---|---|---|---|
| DE | 1800996 | | 11/1959 | |
| DE | 7400614 | | 2/1975 | |
| DE | 3337735 | | 6/1985 | |
| DE | 3940488 | | 6/1991 | |
| DE | 29611785 | | 11/1996 | |
| FR | 1277130 | * | 10/1961 | ................. 384/49 |
| GB | 914917 | * | 1/1963 | ................. 384/49 |

* cited by examiner

Primary Examiner—Greg Binda

(57) ABSTRACT

In an adjustable-length shaft (1) for transmitting torques comprising a circular inner shaft component (2) that is mounted coaxially through a linear ball bearing for sliding telescopically in axial direction in a hollow outer shaft component (3), the inner shaft component (29 is mounted by two spaced-apart pre-stressed linear ball bearings (4) that are arranged on opposite end sections (6) of the inner shaft component (2) and are received in a reception bore (19) of the outer shaft component (3), a transmission of torque being achieved by a positive engagement of the inner and the outer shaft components (2, 3).

8 Claims, 2 Drawing Sheets

ADJUSTABLE-LENGTH SHAFT

FIELD OF THE INVENTION

The invention concerns an adjustable-length shaft for transmitting torques, said shaft comprising an inner shaft component of circular cross-section that is mounted coaxially through a linear ball bearing for sliding telescopically in axial direction in a hollow outer shaft component.

BACKGROUND OF THE INVENTION

Generic shafts of the pre-cited types for transmitting torques are known in a variety of designs from the prior art.

Thus, for example, DE 33 37 735 C2 describes a device for transmitting rotary movements that comprises two shaft components telescoped with each other. The telescopic guidance of the inner shaft component is achieved with the help of a linear ball bearing that is arranged directly between the inner shaft component and the axial bore of the outer shaft component. The linear ball bearing comprises a plurality of rows of balls that are oriented linearly in axial direction and retained in a cage. This device for transmitting a rotary movement is used in a motor vehicle drive, the two shaft components for transmitting torques being connected rotationally fast to each other by a corrugated pipe. This requires that both shaft components comprise a flange on each end. A drawback of this arrangement is the complex rotationally fast connection between the two shaft components.

DE 296 11 785 U1 describes a drive shaft for motor vehicle wheels in which a circular inner component is guided for axial displacement in a hollow outer component. In this device, the rotationally fast connection between the two components of the shaft is realized through the linear ball bearing, so that both the inner and the outer shaft component has to be provided with grooves serving as raceways. However, the machining required for making the grooves increases the cost of manufacture of the bearing arrangement as a whole.

A further drawback of the cited prior art is that there is always some play between the two shaft components that leads to a relative tilting of these components or to the production of undesired noise.

OBJECTS OF THE INVENTION

It is therefore an object of the invention to simplify the manufacture and improve the operation of a generic shaft arrangement in which the circular inner component is guided through a linear ball bearing in a hollow outer component.

This and other objects and advantages of the invention will become obvious from the following detailed description.

SUMMARY OF THE INVENTION

The invention achieves the above objects by the fact that the inner shaft component is mounted by two spaced-apart pre-stressed linear ball bearings that are arranged on opposite end sections of the inner shaft component and are received in a reception bore of the outer shaft component, a transmission of torque being achieved by a positive engagement of the inner and the outer shaft components.

This novel configuration of the bearing arrangement assures that a relative axial tilting of the two shaft components due to play between them cannot take place. The two spaced-apart, play-free bearings further contribute to establishing a positive engagement in the shaft arrangement through which the shaft components are fixed relative to each other in radial direction but can slide relative to each other in axial direction without any problem. Further, this special mounting arrangement suppresses vibrations and oscillations in the shaft train that can lead, for example, to increased noise, higher friction and greater sluggishness in the axial displacement of the two components.

According to a further feature of the invention, the positive engagement between the two shaft components is created in their central sections.

According to a further proposition of the invention, the two opposing central sections of the inner and the outer shaft components comprise a splined shaft profile. From the manufacturing point of view, such a splined shaft profile can be produced in a simple manner and has the additional advantage that it permits a simple inter-insertion of the two shaft components.

According to another proposition of the invention concerning the pre-stressed linear ball bearing, the inner shaft component is mounted in a thin-walled bushing that has a uniform wall thickness and is received in the outer shaft component. As viewed in cross-section, the raceway of the bushing comprises at least in one peripheral section, a non-circular elastically yielding raceway convexity, so that at least one row of balls is radially pre-stressed between the raceway convexity and the opposing raceway.

The magnitude of the pre-stress applied to the inner shaft component is determined by the material of which the bushing is made and through its wall thickness. The larger the wall thickness of the material used, the larger is the pre-stress applied to the inner shaft component. The elasticity of the normally used steel materials is also influenced by their hardening, the pre-stress of a hardened thin-walled bushing being heightened.

The level of elasticity also depends on the number of peripheral points at which the bushing comprises a non-circular raceway convexity. According to a further proposition of the invention therefore, the raceway of the bushing comprises a raceway convexity in three peripheral sections that are angularly offset to one another at 120°. As viewed in cross-section, these raceway convexities are sickle-shaped and merge at their peripheral ends smoothly into the circular shape of the raceway. This results in a uniform pre-stressing of the inner shaft component from all sides.

According to a further feature of the invention, the bushing of the linear ball bearing has a larger axial length than an associated cage, and the bushing comprises a radially inward extending flange at each end. These structural measures assure, on the one hand, that an axial sliding of the inner shaft component in the outer shaft component is not obstructed and, on the other hand, that the tubular ball crown ring made up of bearing balls and a cage cannot slip out of the bushing.

According to a final feature of the invention, the described shaft arrangement of the invention is configured as a cardan shaft.

The invention will now be described more closely with reference to the following example of embodiment and the appended drawings.

DETAILED DESCRIPTION OF THE DRAWINGS

Figure 1:
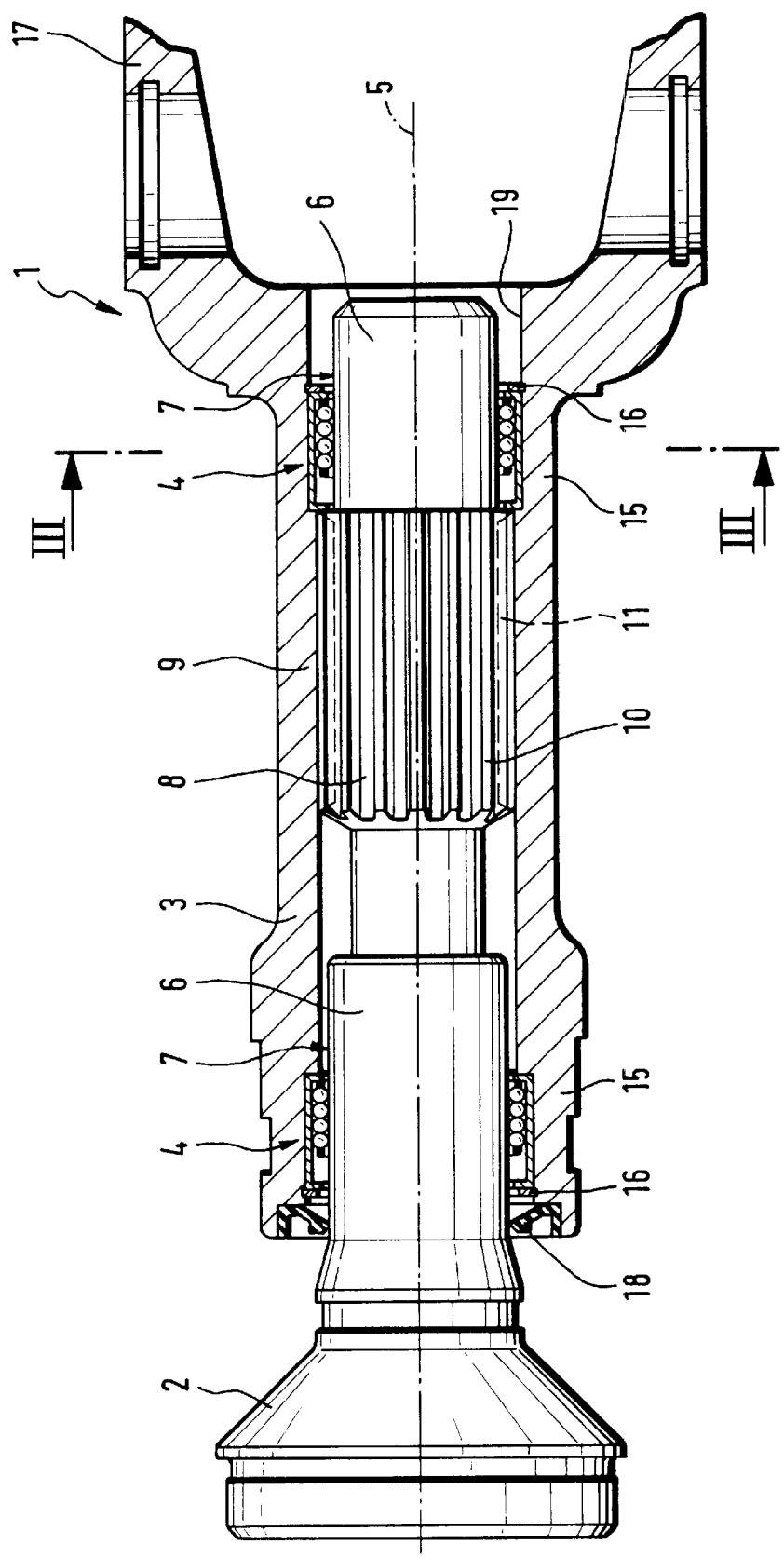
FIG. 1 is a longitudinal section through a cardan shaft configured according to the invention.

The adjustable-length shaft 1 represented in FIG. 1 can be used, for example, as a drive shaft in an agricultural machine. Larger variations of the shaft length can occur in lifting of appliances or in curve-traveling and these have to be compensated for by a relative axial displacement of the shaft components 2, 3. The shaft 1 comprises the inner shaft component 2 that is received in the hollow outer shaft component 3 by two spaced-apart pre-stressed linear ball bearings 4. The axis of rotation of the assembled shaft 1 is identified by the reference numeral 5. The inner shaft component 2 comprises the two opposite end sections 6 which, as viewed in cross-section, have a circular configuration and form the inner raceways 7 for the two spaced-apart pre-stressed linear ball bearings 4. The inner shaft component 2 and the hollow outer shaft component 3 have central sections 8, 9 whose peripheral surfaces oppose each other. These peripheral surfaces have splined shaft profiles 10, 11 that serve to transmit torque. For the purposes of the invention, by splined shaft profiles 10, 11 is to be understood that a projection of the inner shaft component 2 engages into an associated recess of the outer shaft component 3, and vice versa. These splined shaft profiles 10, 11 may extend over the entire peripheral surfaces of the shaft components 2, 3 or only over a part thereof. The pre-stressed linear ball bearings 4, made up of the bushing 12 and the bearing balls 14 arranged in the cage 13, are disposed in the end sections 15 of the outer shaft component 3. The axial fixing of each linear ball bearing 4 is assured by a shoulder, not referenced, of the outer shaft component 3 and by a locking ring 16. At its right end, the outer shaft component 3 is configured as a cardan fork 17 for receiving a cardan spider, while at the left end, the reception bore 19 of the outer shaft component 3 receives the sealing ring 18. This assures, on the one hand, that the shaft 1 is protected from dirt from the outside and, on the other hand, that a leakage of lubricant from the bearing is prevented.

Figure 2:
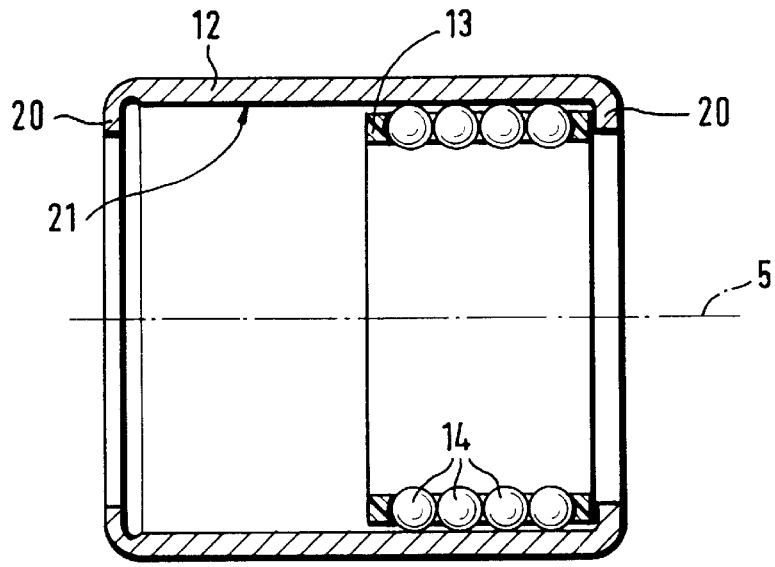
FIG. 2 is an enlarged representation of a longitudinal section of a linear ball bearing.

As can be seen in FIG. 2, the bushing 12 of the pre-stressed linear ball bearing 4 comprises on both its outer ends, a radially inward extending flange 20, so that the tubular cage 13 cannot exit from the shaft components 2, 3 when these are displaced in axial direction. FIG. 2 further shows that the axial length of the cage 13 is smaller than the axial length of the bushing 12 and that the inner peripheral surface of the bushing 12 forms the outer raceway 21 for the bearing balls 14.

Figure 3:
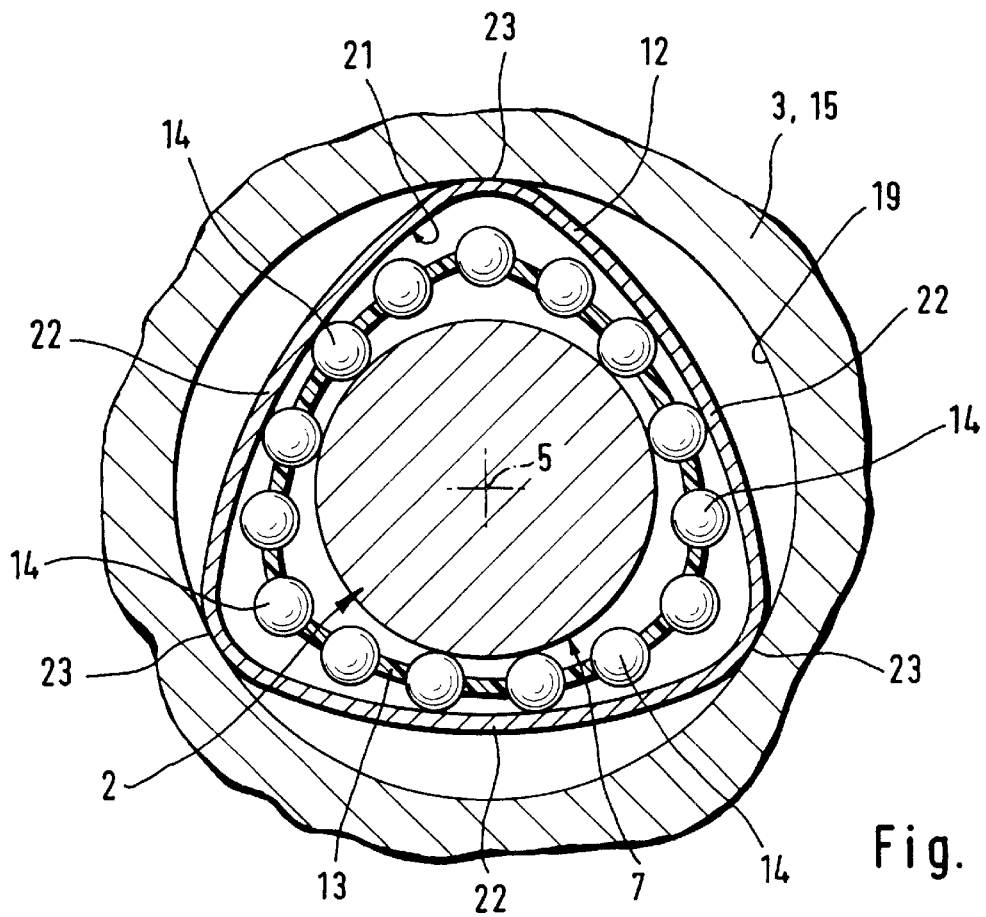
FIG. 3 is a cross-section taken along line III—III of FIG. 1.

FIG. 3 shows one of many possibilities for realizing the freedom of play or pre-stressing of the linear ball bearing 4 which, in this case, is obtained through a polygonal configuration of the bushing 12. For a better clarification of the manner in which it operates, the bushing has been illustrated in an extremely exaggerated manner i.e. almost in the form of a triangle. The bushing comprises raceway convexities 22 oriented toward the inner shaft component 2 in three peripheral sections that are annually off-set to one another at 120° C. so that the bushing is retained in the reception bore 19 of the outer shaft component 3 likewise through three points of support 23. These raceway convexities 22 are flexible in radial direction and approximately sickle-shaped and merges substantially smoothly at peripheral ends into a circular shape of the raceway so that the inner shaft component 2 is retained under pre-stress by the bearing balls 14 that are arranged in the region of the convexities 22 and are in contact in this region both with the outer raceway 21 and with the inner raceway 7.

What is claimed is:

1. An adjustable-length shaft for transmitting torques, said shaft comprising an inner shaft component of circular cross-section that is mounted coaxially through a linear ball bearing for sliding telescopically in axial direction in a hollow outer shaft component, wherein the inner shaft component is mounted by two spaced-apart pre-stressed linear ball bearings that are arranged on opposite end sections of the inner shaft component and are received in a reception bore of the outer shaft component, a transmission of torque being achieved by a positive engagement of the inner and the outer shaft components.

2. A shaft of claim 1, wherein the inner shaft component is mounted in a bushing with elastically yielding raceway that has a uniform wall thickness and is received in the outer shaft component, and a raceway of the bushing comprises at least in one peripheral section, a non-circular elastically yielding raceway convexity, so that at least one row of balls is radially pre-stressed between the raceway convexity and an opposing raceway.

3. A shaft of claim 2, wherein the raceway of the bushing comprises a raceway convexity in three peripheral sections that are angularly offset to one another at 120°.

4. A shaft of claim 2, wherein the raceway convexity, as viewed in cross-section, is sickle-shaped and merges substantially smoothly at peripheral ends into a circular shape of the raceway.

5. A shaft of claim 2, wherein the bushing of the linear ball bearing has a larger axial length than an associated cage, and the bushing comprises a radially inward extending flange at each end.

6. A shaft of claim 1, wherein a joint is arranged at least on one end of the shaft.

7. An adjustable-length shaft for transmitting torques, said shaft comprising an inner shaft component of circular cross-section that is mounted coaxially through a linear ball bearing for sliding telescopically in axial direction in a hollow outer shaft component, wherein the inner shaft component is mounted by two spaced-apart pre-stressed linear ball bearings that are arranged on opposite end sections of the inner shaft component and are received in a reception bore of the outer shaft component, a transmission of torque being achieved by a positive engagement of the inner and the outer shaft components created in central sections of the inner and the outer shaft components.

8. An adjustable-length shaft for transmitting torques, said shaft comprising an inner shaft component of circular cross-section that is mounted coaxially through a linear ball bearing for sliding telescopically in axial direction in a hollow outer shaft component, wherein the inner shaft component is mounted by two spaced-apart pre-stressed linear ball bearings that are arranged on opposite end sections of the inner shaft component and are received in a reception bore of the outer shaft component, a transmission of torque being achieved by a positive engagement of the inner and the outer shaft components situated opposite each other and comprise a splined shaft profile.

* * * * *